(12) United States Patent
Iwanaga et al.

(10) Patent No.: US 9,353,310 B2
(45) Date of Patent: May 31, 2016

(54) LUMINOUS MATERIAL USING FLUORESCENCE AMORPHOUS SOLID

(75) Inventors: Hiroki Iwanaga, Kanagawa (JP); Takahiro Sato, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 957 days.

(21) Appl. No.: 12/716,728

(22) Filed: Mar. 3, 2010

(65) Prior Publication Data

US 2011/0057150 A1  Mar. 10, 2011

(30) Foreign Application Priority Data

Sep. 9, 2009  (JP) ................. 2009-207943

(51) Int. Cl.
| | |
|---|---|
| C09K 11/06 | (2006.01) |
| H01J 1/62 | (2006.01) |
| H01J 63/04 | (2006.01) |
| H05B 33/14 | (2006.01) |

(52) U.S. Cl.
CPC ................ C09K 11/06 (2013.01); H05B 33/14 (2013.01); *C09K 2211/1096* (2013.01); *C09K 2211/182* (2013.01)

(58) Field of Classification Search
CPC ...................................................... C09K 11/06
USPC .............................. 313/503, 504; 252/301.16
See application file for complete search history.

(56) References Cited

U.S. PATENT DOCUMENTS

| | | | |
|---|---|---|---|
| 7,250,117 B2 | 7/2007 | Iwanaga et al. | |
| 7,270,770 B2 * | 9/2007 | Sage et al. | ............... 252/301.16 |
| 7,510,784 B2 | 3/2009 | Iwanaga et al. | |
| 7,575,253 B2 | 8/2009 | Iwanaga | |
| 2004/0265631 A1 * | 12/2004 | Iwanaga et al. | ............... 428/690 |
| 2006/0063036 A1 | 3/2006 | Iwanaga | |
| 2007/0007884 A1 | 1/2007 | Iwanaga et al. | |
| 2009/0050851 A1 | 2/2009 | Sato et al. | |
| 2009/0242839 A1 * | 10/2009 | Winkler et al. | .......... 252/301.36 |

FOREIGN PATENT DOCUMENTS

| | | | |
|---|---|---|---|
| GB | 2232119 | * | 12/1992 |
| JP | 2006-77191 A | | 3/2006 |
| JP | 2007-1880 | | 1/2007 |
| WO | WO2007/107226 | * | 9/2007 |

OTHER PUBLICATIONS

Bulgakov. Triboluminescence of lanthanide acetylacetonates. Russian Chemical Bulletin, International Edition, vol. 53, No. 12, pp. 2712-2714, Dec. 2004.*
Office Action issued Nov. 13, 2012 in Japanese Patent Application No. 2009-207943 (with English-language translation).
Office Action issued Feb. 25, 2014, in Japanese Patent Application No. 2009-207943 with English translation.
Office Action issued on Jul. 23, 2013 in Japanese Patent Application No. 2009-207943 filed on Sep. 9, 2009.
Hiroki Iwanaga et al., "Development of ultraviolet LED devices containing europium (III) complexes in fluorescence layer", Journal of Alloys and Compounds, 408-412, (2006), p. 921-925.

* cited by examiner

*Primary Examiner* — Matthew E Hoban
(74) *Attorney, Agent, or Firm* — Oblon, McClelland, Maier & Neustadt, L.L.P.

(57) ABSTRACT

An amorphous luminous material, which is substantially composed of only rare earth complex compounds, wherein the compounds are two or more kinds of rare earth complexes, and rare earth metal ions, which are center ions of the two or more kinds of rare earth complexes, are different ions.

6 Claims, 2 Drawing Sheets

LUMINOUS MATERIAL USING FLUORESCENCE AMORPHOUS SOLID

CROSS-REFERENCE TO RELATED APPLICATION

This application is based upon and claims the benefit of priority from Japanese Patent Applications No. 2009-207943, filed on Sep. 9, 2009, the entire contents of which are incorporated herein by reference.

FIELD OF THE INVENTION

The present invention relates to luminous material of a fluorescence amorphous solid which is excellent in luminous intensity.

BACKGROUND OF THE INVENTION

In recent years, luminosity and lifetime of LED elements have been significantly improved. Wide market deployment of emission substances is in progress.

In light-emitting diode elements (hereinafter referred to as LED elements) using an inorganic emission substance, which are currently mainstream, the luminous efficiency thereof has been remarkably improved. Specifically, white LEDs are considered to exceed fluorescent lamps in luminous efficiency in the future. However, when LEDs are used for illuminating apparatuses, they are required to be excellent in not only luminous efficiency but also color rendering property in many applications. Under the present circumstances, LEDs using only an inorganic emission substance may not satisfy all of these properties.

The concept to use an organic emission substance in an LED is already known (JP-A 2007-1880 KOKAI). However, under the present circumstances, LEDs using an organic emission substance as a luminous substance have not been put into practical use yet for illumination applications due to the following problems.

1) Specifically, in the case when an organic emission substance is used in an LED having a near-ultraviolet LED, which is currently becoming mainstream, as a light source and using luminous substances of R, G and B, organic compounds are significantly deteriorated by ultraviolet ray. This is because organic compounds are generally susceptible to ultraviolet ray. Specifically, the deterioration is accelerated when an absorption based on n-π* transition is present on a near-ultraviolet region.

2) A fluorescence spectrum of an organic emission substance may change according to the concentration of the substance, which makes control of the spectrum difficult. Furthermore, emission intensity also depends on the concentration. Concentration quenching occurs at a higher concentration region.

3) A fluorescence spectrum changes according to the kind of a polymer to which an organic emission substance is to be dispersed.

In general, a emission substance composed of a rare earth complex may have the following advantages as compared to general organic emission substances.

1) It has a luminescence wavelength which is inherent to a rare earth and not affected by the concentration of a pigment and the kind of a polymer to be dispersed. A fluorescence spectrum of rare earth is stable.

2) The ligand is an organic compound. When the ligand is excited by absorbing light, it returns to a ground state by energy transfer to a center element. Whereby an opportunity is decreased which causes an irreversible chemical change from the excitation state. Therefore, durability against ultraviolet ray may be expected.

Rare earth complexes have the above-mentioned advantages which other organic emission substances do not have. However rare earth complexes have a limitation in luminous intensity since they have a weak light absorbance.

Furthermore, rare earth complexes have a disadvantage that they have generally a low solubility and may not be dissolved at a high concentration when dissolved in a polymer.

SUMMARY OF THE INVENTION

An amorphous luminous material according to an embodiment of the present invention, is substantially composed of only rare earth complex compounds, wherein the compounds are two or more kinds of rare earth complexes, and rare earth metal ions, which are center ions of the two or more kinds of rare earth complexes, are different ions.

The present invention has realized a luminous material which is excellent in luminous intensity.

DETAILED DESCRIPTION OF THE EMBODIMENTS

Figure 1:
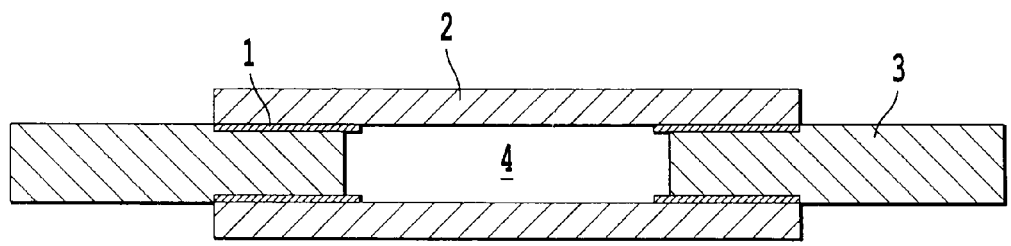
FIG. 1 is a schematic drawing of the structure of a cell for evaluating a luminous property.

Generally, a rare earth complex is used as a solution in various polymers. However, there is a limitation in solubility in a polymer, and a high concentration of a certain value or more is not available. The light absorbance efficiency of a emission substance is at the maximum when 100% of a rare earth complex is present as a homogeneous amorphous solid. However, actually, a homogeneous amorphous solid may not be realized by, for example, 100% of an Eu (III) complex, and even if it may be realized, there is a limitation in luminous intensity due to concentration quenching. Therefore, the inventors have done various studies, and consequently realized a homogeneous amorphous luminous material by using rare earth complexes having two or more kinds of center ions, without dissolving in a polymer.

The luminous material of the present invention is substantially composed of only rare earth complex compounds, wherein the compounds are two or more kinds of rare earth complexes, and rare earth metal ions, which are center ions of the two or more kinds of rare earth complexes, are not the same. Examples of the rare earth metal ions may include Sm, Dy, Ce, Pr, Nd, Pm, Er, Tm and Yb. Since the present invention is a luminous material, at least one of the two or more kinds of rare earth complexes is a luminescent rare earth complex.

As ligands for these rare earth complexes, known organic ligands may be used.

Since the amorphous luminous material of the present invention is not dissolved in a polymer, it has a high heat resistance (measured by DSC, one having a heat resistance of 300° C. or more was confirmed).

By improving the amorphous stability of the rare earth complexes, an amorphous luminous material having a higher luminous efficiency may be obtained. Ligands of rare earth complexes are preferable since the polarity thereof is increased. Whereby the interaction between different kinds of rare earth complexes is increased and the stability of the amorphous is increased. Among the ligands of the rare earth complexes, it is preferable to use the β diketonato ligand of the following chemical formula 1 and the phosphine oxide ligands having a phosphine oxide structure of the following chemical formulae 2 to 4 as ligands since the rare earth complexes forms a more stable and homogeneous amorphous. As these ligands, either or both of a monodentate ligand and a multidentate ligand may be used. In addition to the ligands of the following chemical formulae, bulky ligands which improve the stability of the amorphous are also preferable.

Examples of the ligands other than those of the following chemical formulae may include sulfonylamide, phenanthroline, dimethylsulfoxide, benzimidazole, macrocyclic polyamines, phthalocyanine, polypyridines, crown ethers and the like.

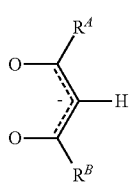

Chemical Formula 1

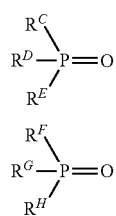

Chemical Formula 2

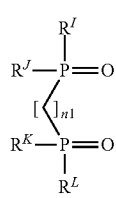

Chemical Formula 3

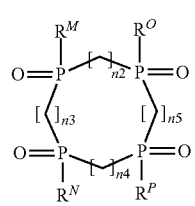

Chemical Formula 4

Examples of $R^A$ and $R^B$ for the β diketonato ligand of the chemical formula 1 may include substituents consisting of a straight chain or branched alkyl group having 1 to 20 carbon atoms, an alkoxy group having 1 to 20 carbon atoms, a phenyl group, a biphenyl group, a naphthyl group, and substituted forms thereof, and a hydroxy group and a halogen group.

It is preferable that $R^A$ and $R^B$ are different substituents since steric hindrance is increased, whereby the luminous amorphous solid becomes a more stable amorphous.

It is more preferable that at least one of $R^A$ and $R^B$ is a perfluoroalkyl group since the luminous property of the luminous amorphous solid is improved.

Examples of $R^C$ to $R^P$ for the phosphine oxide ligands of the chemical formulae 1 to 4 may include substituents consisting of a straight chain or branched alkyl group having 1 to 20 carbon atoms, an alkoxy group having 1 to 20 carbon atoms, a phenyl group, a biphenyl group, a naphthyl group, and substituted forms thereof, and a hydroxy group and a halogen group.

It is necessary that the number of repeating (n) of the alkyl chain which links the phosphine oxides has a length which allows coordination to the center ion of the rare earth complex, and n (n1 to 5) may be an integer of, for example, 1 to 20. The higher the coordinate energy is, the higher the luminous efficiency tends to become. Thus, n is preferably 1 to 5, of these n is specifically preferably 3 to 5 since the coordinate energy is increased. It is preferable that the ligand of the chemical formula 4 has n2 and n4 of the same number and n3 and n5 of the same number.

It is preferable that the combinations are different and bulkinesses are different in $R^C$ to $R^E$ and $R^F$ to $R^H$ for the phosphine oxide ligand of the chemical formula 2 since the rare earth complex becomes asymmetric to contribute to the homogeneity and stability of the amorphous.

It is preferable that the combinations are different and bulkinesses are different in $R^I$ and $R^J$ and $R^E$ and $R^H$ for the phosphine oxide ligand of the chemical formula 3 since the rare earth complex becomes asymmetric to contribute to the homogeneity and stability of the amorphous.

The mass ratio of the complexes is explained with referring to the combination of an Eu (III) complex and a Tb (III) complex. The mass ratio of the luminescent complex (the Eu (III) in the example) and other rare earth complex may also be applied to other combinations.

An organic amorphous luminous material composed of only an Eu (III) complex and a Tb (III) complex, wherein the mass ratio of the Eu (III) complex to the Tb (III) complex of 99:1 to 50:50 is preferable. As shown in the above-mentioned ratio, even a trace amount of Tb (III) contributes to the amorphous homogeneity of Eu (III). The mass ratio of the Eu (III) complex to the Tb (III) complex is preferably 95:5 to 50:50 in view of the homogeneity of the amorphous. When the concentration of the Tb (III) complex is high (more than 50 mass %), it is not preferable since the concentration of the Eu (III) complex is decreased and the luminous intensity is decreased. The mass ratio of the Eu (III) complex to the Tb (III) complex is more preferably 99:1 to 70:30 in view of the luminous efficiency of the luminous material.

As the rare earth complexes to which the ligands of the chemical formulae 1 to 4 are coordinated, the following Eu (III) complexes and Tb (III) complexes are exemplified. The combinations of the center ion and ligands are not limited to the followings.

Chemical Formula 5

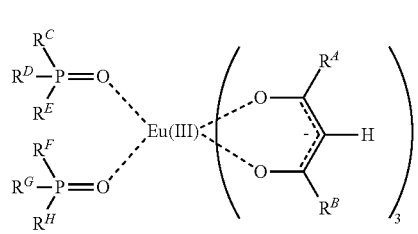

Chemical Formula 6

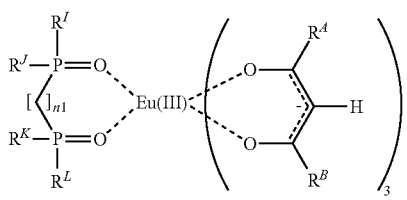

Chemical Formula 7

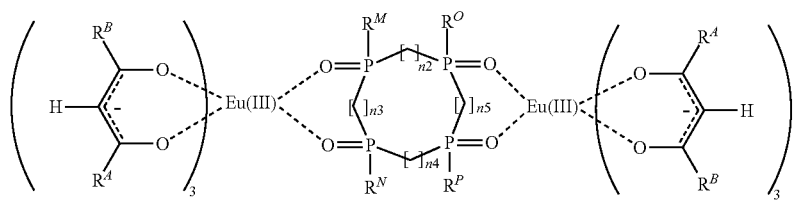

Chemical Formula 8

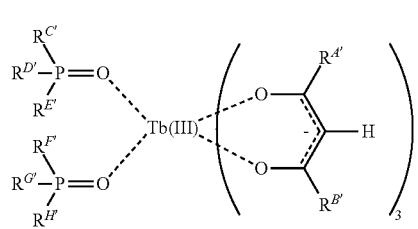

Chemical Formula 9

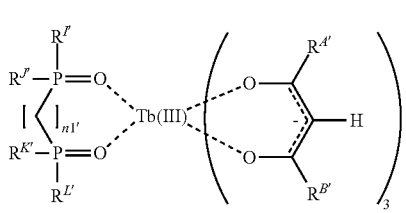

Chemical Formula 10

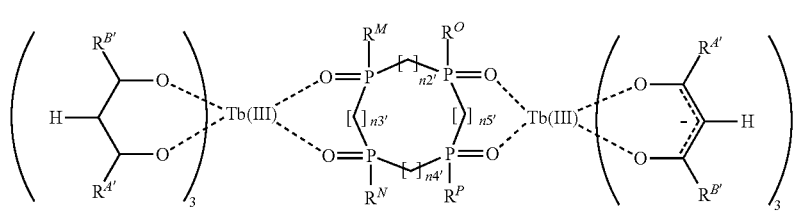

Chemical Formula 11

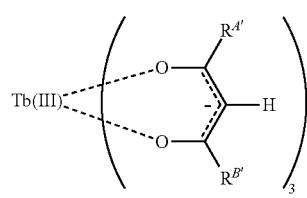

Hereinafter examples of the rare earth complexes used in the embodiments are specifically explained. The rare earth complexes used in the embodiments are only examples, and a rare earth complex which is not exemplified may also be used in a similar manner as long as it is a rare earth complex which satisfies the conditions described in the specification.

In the Eu (III) complex shown in the chemical formula 12, one of the substituents of the β diketonato is a fluoroalkyl group and another is a bulky substituent. In the substituents of the diphosphinedioxide having an asymmetric structure, aromatic substituents and aliphatic substituents form a pair, and the meta position of each aromatic substituent is substituted by a fluoroalkyl group. By the structural characteristic (asymmetric characteristic) mentioned above, an amorphous having a high homogeneity and high stability is realized.

Chemical Formula 12

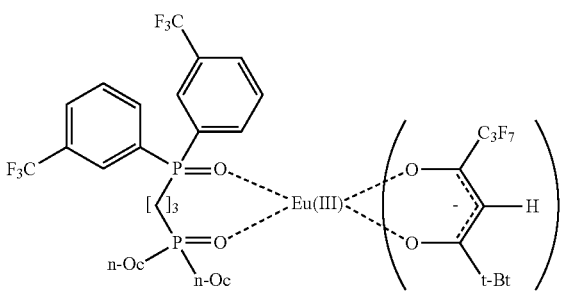

In the Eu (III) complex shown in the chemical formula 13, one of the substituents of the β diketonato is a fluoroalkyl group and another is a bulky aromatic substituent. Different two kinds of phosphine oxides are coordinated to the Eu (III) ion, and one of which has an aromatic substituent and another has aliphatic substituents. By the structural characteristic (asymmetric characteristic) mentioned above, an amorphous having a high homogeneity and stability is realized.

Chemical Formula 13

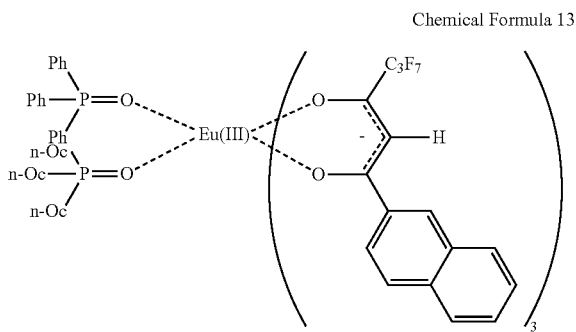

In the Tb (III) complex shown in the chemical formula 14, the substituents of the β diketonato are sterically bulky, and the substituents of the diphosphinedioxide having an asymmetrical structure forms a pair of aromatic substituents and aliphatic substituents. By the structural characteristic (asymmetric characteristic) mentioned above, an amorphous having a high homogeneity and stability is realized.

Chemical Formula 14

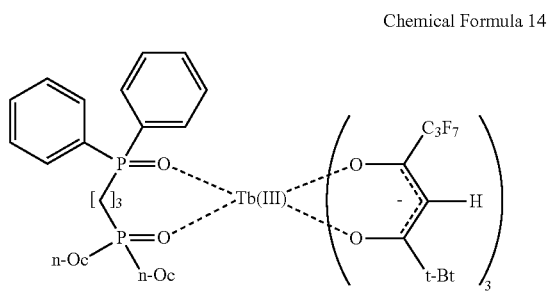

Hereinafter the examples of the present invention are described, but the present invention is not limited by these examples.

Example 1

The Eu (III) complex represented by the chemical formula 13 was mixed with 5 wt % of the Tb (III) complex represented by the chemical formula 14, and heat-melted at 120° C. to prepare a transparent amorphous solid. The amorphous solid was interposed in an evaluation cell as shown in FIG. 1 and excited with light of 464 nm, whereby about 20% of increase in the luminous intensity was observed as compared to the case when only the Eu (III) complex represented by the chemical formula 13 was used in Comparative Example 1, as shown in FIG. 2.

Comparative Example 1

Figure 2:
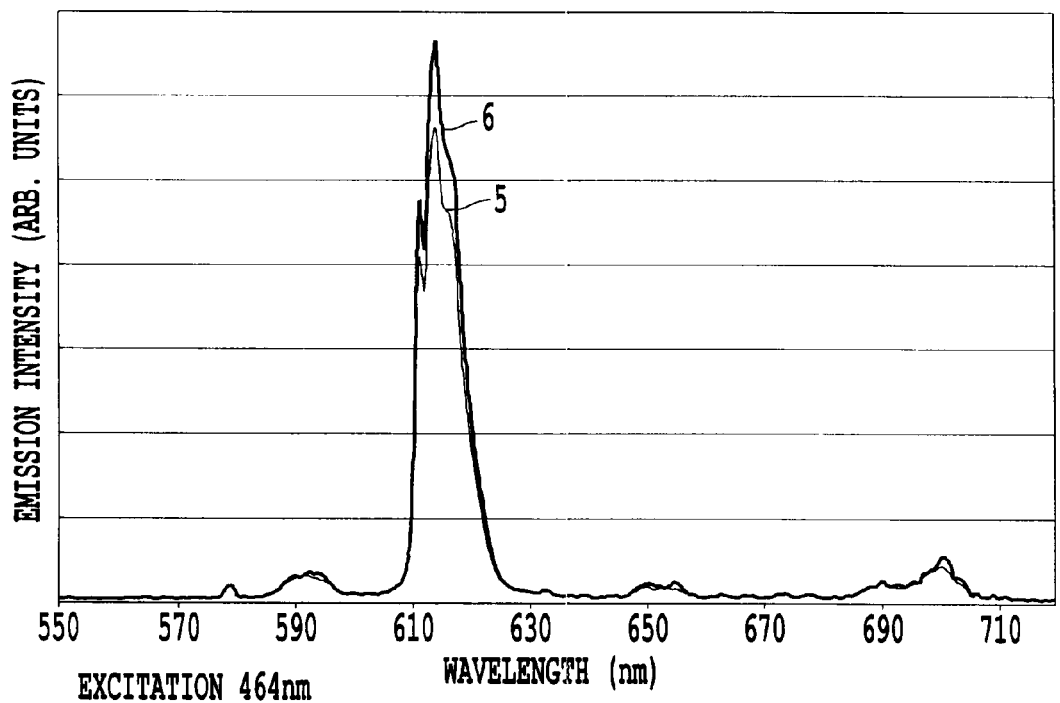
FIG. 2 is a graph for comparing emission intensities of amorphous solids in the cells for evaluation.

Only the Eu (III) complex represented by the chemical formula 13 was heat-melted to prepare an amorphous solid, and an evaluation cell as shown in FIG. 1 was made. The luminescence spectrum was measured in a manner similar to Example 1.

Example 2

Figure 3:
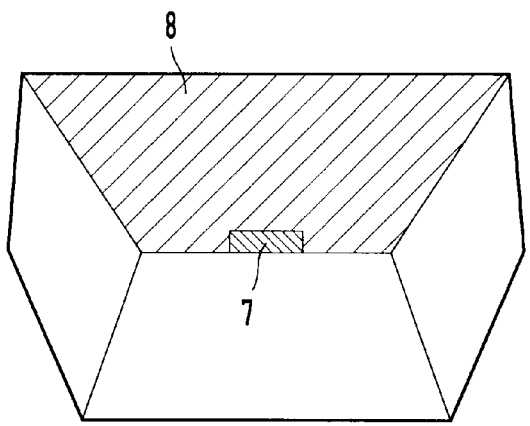
FIG. 3 is a schematic drawing of the structure of the LED element of the present invention.

The Eu (III) complex represented by the chemical formula 13 was mixed with 20 wt % of the Tb (III) complex represented by the chemical formula 14 (the concentration of the Eu (III) complex was 80 wt %), and heat-melted at 120° C. to prepare a transparent amorphous solid. The amorphous solid was embedded in the upper portion of an LED chip having a luminescence center wavelength of about 400 nm while heat-melting was carried out to prepare an LED element which emits red light as shown in FIG. 3. The luminous flux was fine as 542 mlm when an electric current of 20 mA was applied to the LED chip. It was found that, as compared to the LED element on which a fluorescence layer had been formed by dissolving the Eu (III) complex represented by the chemical formula 3 in a fluorine-based polymer, the luminous flux increased even at the same concentration of the Eu (III) complex.

Comparative Example 2

A red light emitting LED element was prepared in a similar manner to Example 2 in which 20 wt % of the Eu (III) complex represented by the chemical formula 13 was dissolved in a fluorine-based polymer CEFRAL 220 (manufactured by Central Glass Co., Ltd.), and flashed in a similar manner to Example 2. The luminous flux was 367 mlm.

Comparative Example 3

An LED element was prepared in a similar manner to Comparative Example 2 except that the concentration of the Eu (III) complex represented by the chemical formula 13 was 40 wt %. The luminous flux was measured under the same condition and found to be 450 mlm.

Comparative Example 4

An LED element was prepared in a similar manner to Comparative Example 2 except that the concentration of the Eu (III) complex represented by the chemical formula 13 was 60 wt %. The luminous flux was measured under the same condition, and was found to be 400 mlm.

Comparative Example 5

An LED element was prepared in a similar manner to Comparative Example 2 except that the concentration of the Eu (III) complex represented by the chemical formula 13 was 80 wt %. The luminous flux was measured under the same condition, and was found to be 408 mlm.

Figure 4:
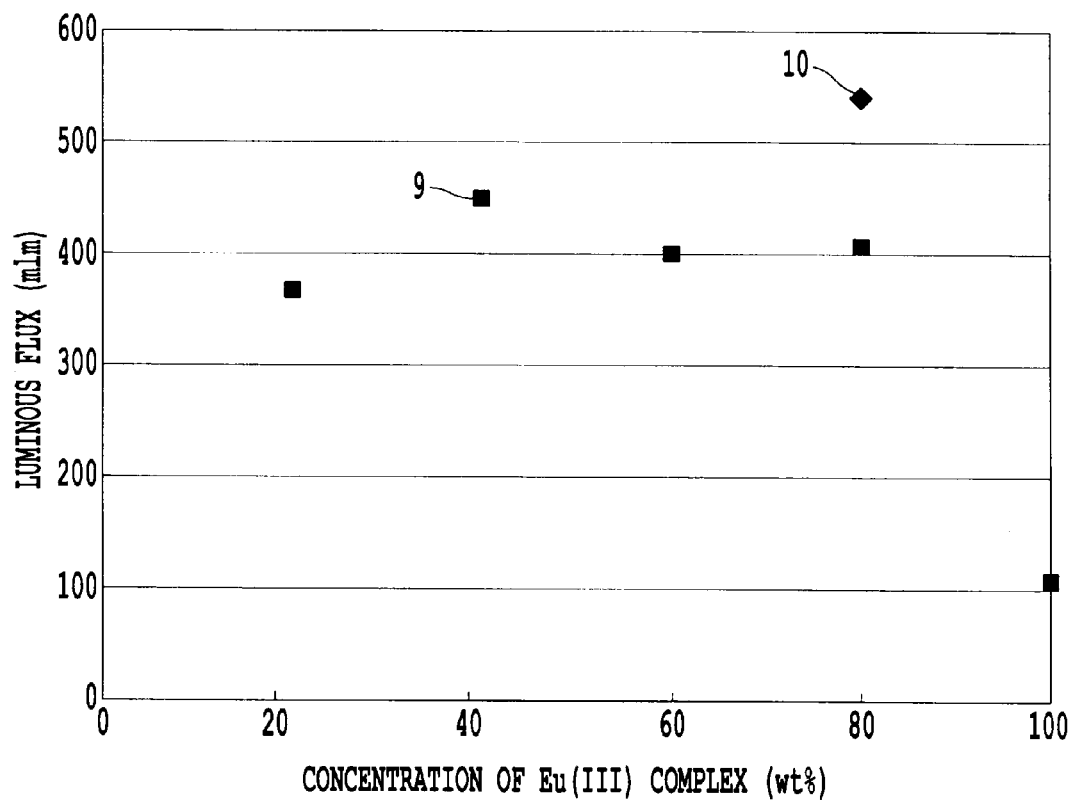
FIG. 4 is a graph for comparing the luminous fluxes of the LED elements of the present invention and Comparative Examples.

The measured value of the luminous fluxes of the LEDs of Example 2 and Comparative Examples 2, 3, 4 and 5 are shown in FIG. 4. Comparative Examples 2, 3, 4 and 5 used the same condition except that the concentration of the Eu (III) complex was changed, and no increase in the luminous flux was observed even when the concentration increased. On the other hand, comparing Example 2 and Comparative Example 5 which used the same concentration of the Eu (III) complex of 80 wt %, the luminous flux was 542 mlm in Example 2 but was 408 mlm in Comparative Example 5. Therefore, it is recognized that the luminous flux was significantly increased by the present invention.

Comparative Example 6

An LED element was prepared in a similar manner to Comparative Example 2 except that only the Eu (III) complex represented by the chemical formula 13 was used for the emitting layer. The luminous flux was measured under the same condition, and was found to be 108 mlm. When the concentration of the Eu (III) complex was 100%, the luminous flux was low. This is considered to be a result of concentration quenching.

Example 3

An LED element was prepared in a similar manner to Example 2 except that the compound represented by the chemical formula 12 was used as the Eu (III) complex. The evaluation was carried out in a similar manner, whereby the luminous flux was found to be 450 mlm.

Comparative Example 7

An evaluation was carried out in a similar manner to Comparative Example 3 except that only the Eu (III) complex represented by the chemical formula 12 was used for the emitting layer. The luminous flux was 70 mlm.

From the results of Example 3 and Comparative Example 7, increase in luminous flux was observed by mixing the Tb (III) complex.

Example 4

An LED element was prepared in a similar manner to Example 2 except that the compound represented by the chemical formula 15 was used as the Eu (III) complex. The evaluation was carried out in a similar manner, whereby the luminous flux was found to be 470 mlm.

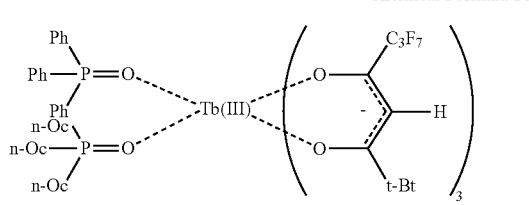

Chemical Formula 16

Example 6

The evaluation was carried out in a similar manner to Example 2 except that the Tb (III) complex represented by the chemical formula 17 was used, whereby the luminous flux was found to be 250 mlm.

From the results of Example 4 and Comparative Example 8, increase in the luminous flux was observed when the Tb (III) complex was mixed.

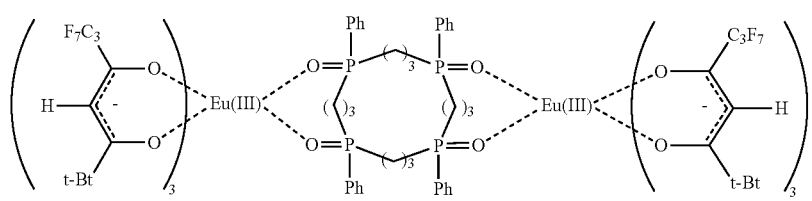

Chemical Formula 15

Comparative Example 8

Example 5

The evaluation was carried out in a similar manner to Example 3 except that only the Eu (III) complex represented by the chemical formula 15 was used for the fluorescence layer, whereby the luminous flux was found to be 65 mlm.

The evaluation was carried out in a similar manner to Example 2 except that the Tb (III) complex represented by the chemical formula 16 was used, whereby the luminous flux was found to be 550 mlm.

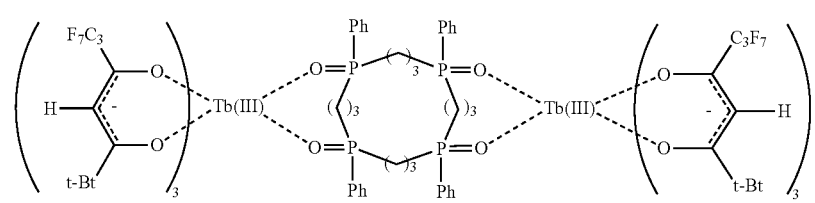

Chemical Formula 17

Example 7

The evaluation was carried out in a similar manner to Example 2 except that the Tb (III) complex represented by the chemical formula 18 was used, whereby the luminous flux was found to be 400 mlm.

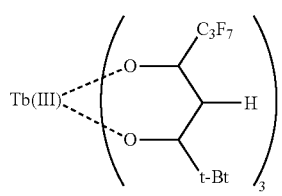

Chemical Formula 18

From Examples 5, 6 and 7, it was found that the effect of the present invention is exhibited when the kind of the Tb (III) complex to be mixed is changed. Comparative Example 6 did not include a Tb (III) complex for comparison, and the luminous flux thereof was 108 mlm. Although the absolute value of the luminous flux was small in the condition of Examples 6 and 7, the effect of the present invention was demonstrated.

Example 8

The evaluation was carried out in a similar manner to Example 2 except that the concentration of the Tb (III) complex was 5 wt %, whereby the luminous flux was found to be 480 mlm.

Example 9

The evaluation was carried out in a similar manner to Example 3 except that the concentration of the Tb (III) complex was 5 wt %, whereby the luminous flux was found to be 430 mlm.

From Examples 8 and 9, it was demonstrated that the effect of the present invention was exhibited even when the concentration of the Tb (III) complex to be added was decreased to 5%.

Although examples in which the materials of the present invention were used for a light emitting device are shown in the above-mentioned Examples, the material may be used for other applications of fluorescent or emitting materials such as inks and ornaments using the luminous materials.

What is claimed is:

1. An amorphous luminous material, consisting essentially of:
   rare earth complex compounds,
   wherein the compounds are a combination of a Eu (III) complex and a Tb (III) complex,
   wherein the Eu (III) complex is represented by the formula 7:

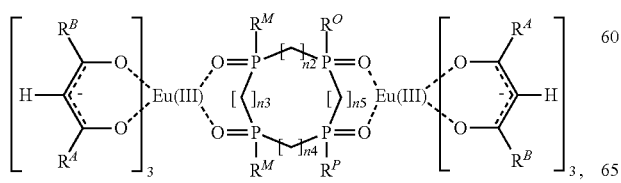

Formula 7 and wherein the Tb (III) complex is represented by at least one formula selected from the group consisting of the formulae 8-11:

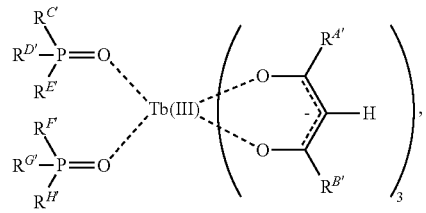

Formula 8

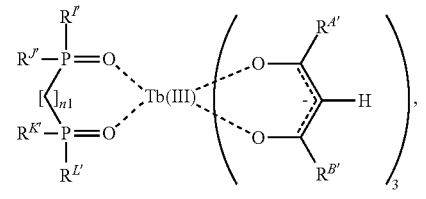

Formula 9

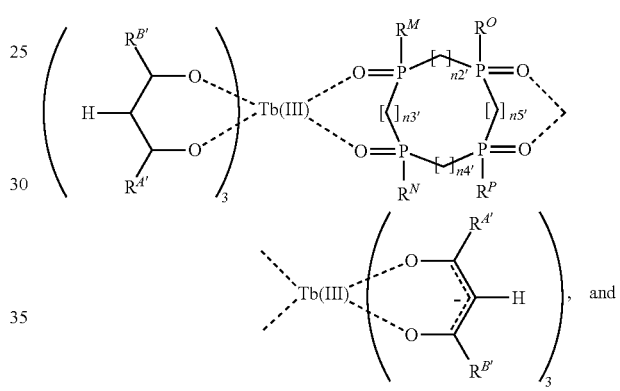

Formula 10 and

Formula 11

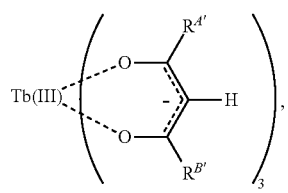

wherein the formula 8 includes the formula A' and the formula B':

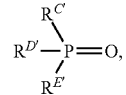

Formula A'

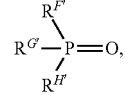

Formula B' wherein the formula A' is different from the formula B',
wherein $R^A$, $R^B$, $R^M$ to $R^P$ and $R^{A'}$ to $R^{P'}$ each independently is an optionally substituted straight chain or branched alkyl group having from 1 to 20 carbon atoms, an optionally substituted alkoxy group having from 1 to 20 carbon atoms, an optionally substituted phenyl group, an optionally substituted biphenyl group, an optionally substituted naphthyl group, or a halogen group, and n1 to n5 and n1' to n5' each independently is an integer of from 1 to 20.

2. The material of clam 1, wherein
$R^A$ and $R^B$ are different functional groups,
$R^{A'}$ and $R^{B'}$ are different functional groups,
$R^{C'}$ to $R^{E'}$ and $R^{F'}$ to $R^{H'}$ are functional groups of different combinations, and
$R^{I'}$ to $R^{J'}$ and $R^{K'}$ to $R^{L'}$ are functional groups of different combinations.

3. The material of clam 1, wherein n1 to n5 and n1' to n5' are each independently an integer of from 3 to 5.

4. The material of clam 1, wherein
at least one of $R^A$ and $R^B$ is a perfluoroalkyl group, or
at least one of $R^{A'}$ and $R^{B'}$ is a perfluoroalkyl group.

5. The material of claim 1, wherein the Eu(III) complex is represented by the formula 15:

Formula 15

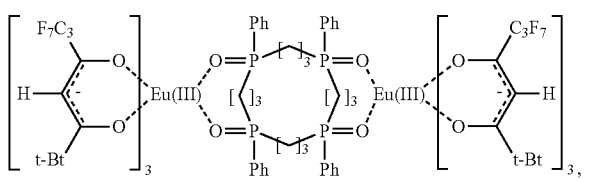

and wherein the Tb (III) complex is represented by at least one formula selected from the group consisting of the formulae 14, 16, 17, and 18:

Formula 14

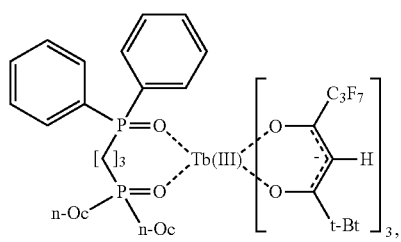

Formula 16

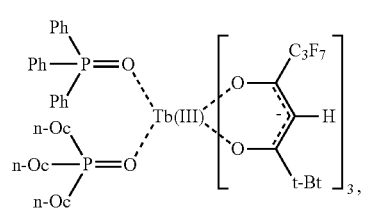

Formula 17

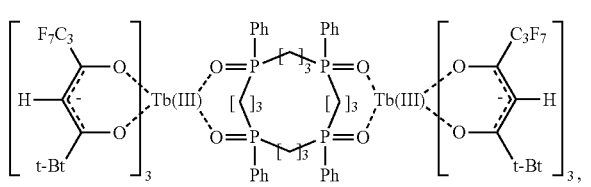

Formula 18

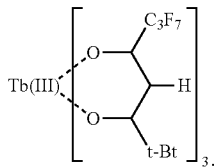

6. The material of claim 1, wherein the compounds are used as an emitting substance of luminous element,
and wherein the Tb (III) complex is represented by at least one formula selected from a group consisting of the formulas 14, 16, 17, and 18:

Formula 14

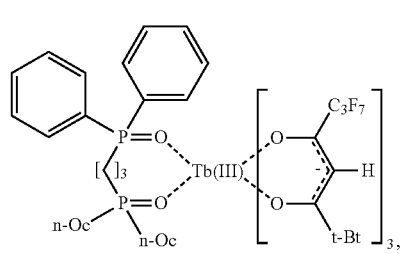

Formula 16

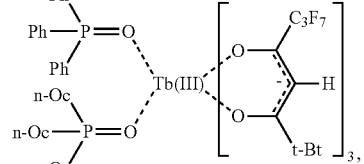

Formula 17

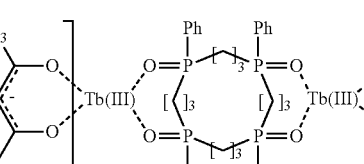

and

Formula 18

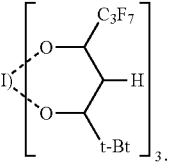

* * * * *